United States Patent
Soldate (10) Patent No.: US 11,210,688 B2
(45) Date of Patent: Dec. 28, 2021

(54) SYSTEMS AND METHODS FOR INTERACTIVE SHOPPING USING A MOBILE COMPUTING DEVICE

(75) Inventor: David William Soldate, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 275 days.

(21) Appl. No.: 13/523,932

(22) Filed: Jun. 15, 2012

(65) Prior Publication Data

US 2013/0339115 A1 Dec. 19, 2013

(51) Int. Cl.
*G06Q 30/00* (2012.01)
*G06Q 30/02* (2012.01)
*G06Q 30/06* (2012.01)

(52) U.S. Cl.
CPC ......... *G06Q 30/0207* (2013.01); *G06Q 30/06* (2013.01)

(58) Field of Classification Search
CPC .................................. G06Q 30/0207–30/0277
USPC ..................................................... 705/14, 319
See application file for complete search history.

(56) References Cited

U.S. PATENT DOCUMENTS

| | | | |
|---|---|---|---|
| 5,424,524 A | 6/1995 | Ruppert et al. | |
| 6,618,683 B1* | 9/2003 | Berstis ................ | G01C 21/165 340/10.1 |
| 2006/0047577 A1 | 3/2006 | Dietz et al. | |
| 2010/0153209 A1* | 6/2010 | de Rubertis ........ | G06F 16/4393 705/14.51 |
| 2011/0140380 A1 | 6/2011 | Ulrich | |
| 2012/0095853 A1* | 4/2012 | von Bose ........... | G06Q 30/0641 705/16 |
| 2012/0185395 A1* | 7/2012 | Wilkes ................ | G06Q 20/06 705/44 |
| 2012/0284107 A1* | 11/2012 | Gernaat .............. | G06Q 20/387 705/14.26 |
| 2013/0254114 A1* | 9/2013 | Smith ................. | G06Q 20/20 705/67 |
| 2014/0188658 A1* | 7/2014 | Li et al. .............. | 705/26.8 |

OTHER PUBLICATIONS

Walmart, In-Store Pick-up Receipt, Sep. 19, 2008.*
Walmart In-Store Pick-Up reciept, dated Sep. 19, 2008.*

* cited by examiner

*Primary Examiner* — Waseem Ashraf
*Assistant Examiner* — Richard G Reinhardt
(74) *Attorney, Agent, or Firm* — Fitch, Even, Tabin & Flannery, LLP (57) ABSTRACT

A computer-implemented method for interactive shopping by a customer includes providing a downloadable user interface readable on a mobile electronic device that receives shopping list data representing items in a shopping list associated with the customer and receives coupon data representing coupons held by the customer for one or more of the items in an inventory of items for sale at a retail store. The shopping list includes items selected by the customer from the inventory of items. The method may further include receiving a request to checkout from the customer and, in response thereto, consummating a sale of the items in an electronic shopping cart by discounting a price of each item in the electronic shopping cart for which the customer holds coupons by an amount corresponding to the respective coupons.

16 Claims, 5 Drawing Sheets

Shopping List

| Item /304 | Quantity /306 | Coupon /308 | Price /310 | In cart /312 |
|---|---|---|---|---|
| White bread | 1 | | $2.19 | √ |
| Broccoli crowns | 1 lb. | | $2.59 | √ |
| Milk, whole | 1 gal. | | $2.89 | |
| Tomato soup, 12 oz. | 1 | * 20¢ off | $0.89 | √ |
| Frozen waffles | 1 | * 25¢ off | $3.29 | |
| Ground beef, 85% | 1 lb. | * | $3.29 | |
| Eggs | 1 doz. | | $1.99 | |
| Potato chips | 1 | * $1/ea | $1.00 | |
| Soda crackers | 1 | | $2.19 | |

TOTAL SHOPPING LIST (INCLUDING COUPON DISCOUNTS)    $20.32 /314
TOTAL IN CART (INCLUDING COUPON DISCOUNTS)    $5.67 /316
COUPON SAVINGS    ($2.45) /318

Unused Coupons /320

| Item /322 | Discount /324 | Expiration Date /326 |
|---|---|---|
| Soda | 50¢ off | DEC 31 2012 |
| Spaghetti | Buy 2/Get 1 Free | JUN 5 2012 |
| Deli ham | $1.89/lb | MAY 20 2012 |
| Cotton swabs, 64 ct. | $1.00 | none |
| Popsicles | Buy 1/Get 1 Free | NOV 30 2012 |

SYSTEMS AND METHODS FOR INTERACTIVE SHOPPING USING A MOBILE COMPUTING DEVICE

BACKGROUND

1. Field of Invention

Embodiments of the invention relate generally to systems and methods for interactive retail shopping, and more particularly, computer-implemented techniques for integrated creation and management of shopping lists, coupon lists and/or electronic shopping carts.

2. Description of Related Art

For many people, shopping involves some amount of planning prior to making a trip to the store. By way of example, a customer may prepare a shopping list of items that the customer intends to buy, as well as clip coupons for at least some of the items on the shopping list. While shopping at the store, the customer may check items off of the shopping list as the items are picked from the shelf and placed into a shopping cart. The items in the cart are then rung up at a point-of-sale (POS) terminal, along with any coupons, so that the customer can complete the purchase, receiving the coupon discounts. Despite advances in technology, customers still tend to use paper-based shopping lists and coupons out of convenience, necessity, or both.

Therefore, typically a retailer cannot determine what items the customer is purchasing or what coupons the customer is using until the customer reaches the point of sale. Furthermore, since in-store shopping is often done anonymously, the retailer cannot identify customer-specific purchasing trends over multiple shopping trips except in limited circumstances where the customer chooses to provide identification, such as by using a discount or purchasing card that is provided by the retailer and associated with the customer.

SUMMARY

Various embodiments are directed to systems and methods for interactive shopping, including techniques for creating and managing shopping lists and lists of coupons for retail store items, maintaining data related to items selected by customers in the store, calculating purchase totals including coupon discounts, and/or paying for the items at the store point of sale. Additionally, some embodiments utilize store inventory data in conjunction with one or more of the above aspects.

In one embodiment, a computer-implemented method for interactive shopping by a customer includes providing a downloadable user interface readable on a mobile electronic device that receives shopping list data representing items in a shopping list associated with the customer and receives coupon data representing coupons held by the customer for one or more of the items in the inventory of items for sale at the retail store. The shopping list includes items selected by the customer from an inventory of items for sale at a retail store.

In one embodiment, an interactive shopping system includes a server having a processor and a memory coupled together. The server is configured to be operatively coupled to a data communication network and to receive data from and send data to a mobile electronic device via a user interface. The memory includes instructions that when executed by the processor cause the server to execute a shopping list component for managing shopping list data representing items in a shopping list associated with a customer, the shopping list including items selected by the customer from an inventory of items for sale in a retail store, and a coupon management component for managing coupon data representing coupons held by the customer for one or more of the items in the inventory of items for sale at the retail store. The coupon management component is configured to receive new coupon data representing a new coupon held by the customer for an item, the new coupon data being provided by the customer, via the user interface, as a result of scanning a barcode on the new coupon and/or entering a code associated with the new coupon. The coupon management component is further configured to update the coupon data to add the new coupon to the coupons held by the customer. The shopping list component is configured to update the shopping list data to add the item associated with the new coupon to the shopping list if the item associated with the new coupon is not in the shopping list. The shopping list component is further configured to display to the customer, using the user interface and based upon the updated shopping list data and the updated coupon data, the items in the shopping list indicating items for which the customer holds coupons and/or indicating items for which the customer does not hold coupons.

In one embodiment, a non-transitory computer-readable medium has stored thereon computer-executable instructions that when executed by a computer cause the computer to store, in one or more databases, shopping list data representing items in a shopping list associated with the customer, the shopping list including items selected by the customer from an inventory of items for sale at a retail store. The instructions further cause the computer to store, in the one or more databases, coupon data representing coupons held by the customer for one or more of the items in the inventory of items for sale at the retail store. The instructions further cause the computer to receive, via a user interface, new coupon data representing a new coupon held by the customer for an item, the new coupon data being provided by the customer as a result of scanning a barcode on the new coupon and/or entering a code associated with the new coupon. In response to receiving the new coupon data, the instructions further cause the computer to update the coupon data to add the new coupon to the coupons held by the customer and, if the item associated with the new coupon is not in the shopping list, update the shopping list data to add the item associated with the new coupon to the shopping list. The instructions further cause the computer to display, via the user interface and based upon the updated shopping list data and the updated coupon data, the items in the shopping list indicating items for which the customer holds coupons and/or indicating items for which the customer does not hold coupons.

In one embodiment, a computer-implemented method for interactive shopping includes storing, by a server and in a computer-readable storage medium, shopping list data representing items in a shopping list associated with a customer, the shopping list including items selected by the customer from an inventory of items for sale at a retail store. The method further includes storing, by the server and in the computer-readable storage medium, coupon data representing coupons held by the customer for one or more of the items in the inventory of items for sale at the retail store. The method further includes receiving, by the server and via a data communication network, new coupon data representing a new coupon held by the customer for an item, the new coupon data being provided by the customer as a result of scanning a barcode on the new coupon and/or entering a code associated with the new coupon. The method further includes, in response to receiving the new coupon data, updating the coupon data to add the new coupon to the coupons held by the customer and, if the item associated with the new coupon is not in the shopping list, updating the shopping list data to add the item associated with the new coupon to the shopping list. The method further includes displaying to the customer, using a user interface operatively coupled to the server via the data communication network and based upon the updated shopping list data and the updated coupon data, the items in the shopping list indicating items for which the customer holds coupons and/or indicating items for which the customer does not hold coupons.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Smart phones, personal digital assistants (PDAs), tablet computers, and other types of mobile electronic devices have become commonplace. Embodiments are directed toward interactive shopping using such devices, among others. In one embodiment, a user interface is provided by a retailer for download onto a user computing device, such as any of those listed above. Customers may download the user interface onto their computers or mobile devices, and use the user interface to create and manage shopping lists and lists of coupons for items at the retail store. Using a scanner or camera, such as those built into a mobile phone or tablet computer, the customer may scan coupon codes (e.g., bar codes) via the user interface, and the list of coupons held by the customer may be updated accordingly. Additionally, items associated with the coupons may be added to the customer's shopping list if those items are not already in the shopping list. The user interface may display indications of which items on the shopping list the customer holds coupons for, along with current pricing and available discount information. Data representing the shopping and coupon lists may be stored in a remote database within a cloud computing environment, accessible through the user interface.

While shopping at the store, the customer may continue to use their own mobile computing device or another mobile device provided by the store to scan product codes as items are selected and placed in a shopping cart. The shopping list may be updated to reflect which items the customer has selected and which items the customer still needs to pick up. The user interface may also display a list of items that the customer holds coupons for, if those items are not already on the shopping list. Any items picked up may be added to an electronic shopping cart, and the user interface may display a running total of the cost of the items in the electronic shopping cart with and/or without the coupon discounts applied. Data associated with the electronic shopping cart may be stored remotely (e.g., in the cloud or in a database maintained by the store). When the customer is ready to check-out, the electronic shopping cart data may be accessed, for example, by a self-checkout terminal or POS terminal to consummate the purchase of the items in the electronic shopping cart as well as to update the shopping and coupon lists to remove those items and used coupons.

As discussed above, in some embodiments, data associated with the shopping list, the coupon list, and/or the electronic shopping cart may, for example, be stored on the customer's computing device and/or on one or more network-based storage devices (also referred to herein as the cloud) that are accessible by both the customer and the retailer. In the latter implementation, the retailer may have access to the same data as the customer (i.e., the retailer may have access to customer-specific shopping list, coupon list, and/or shopping cart data before the customer reaches the point of sale). In other embodiments, software components for generating, managing and consuming the data may also be stored in the cloud and/or executed by a cloud-based service and accessible to the customer via the user interface. In any of the above-described embodiments, at least some shopping list and coupon data are managed in an integrated manner from pre-shopping trip planning to in-store purchasing regardless of whether the customer uses a mobile computing device of their own, a mobile computing device provided by the store or other computing devices (e.g., self-checkout or POS terminal) at different points in the process.

Figure 1:
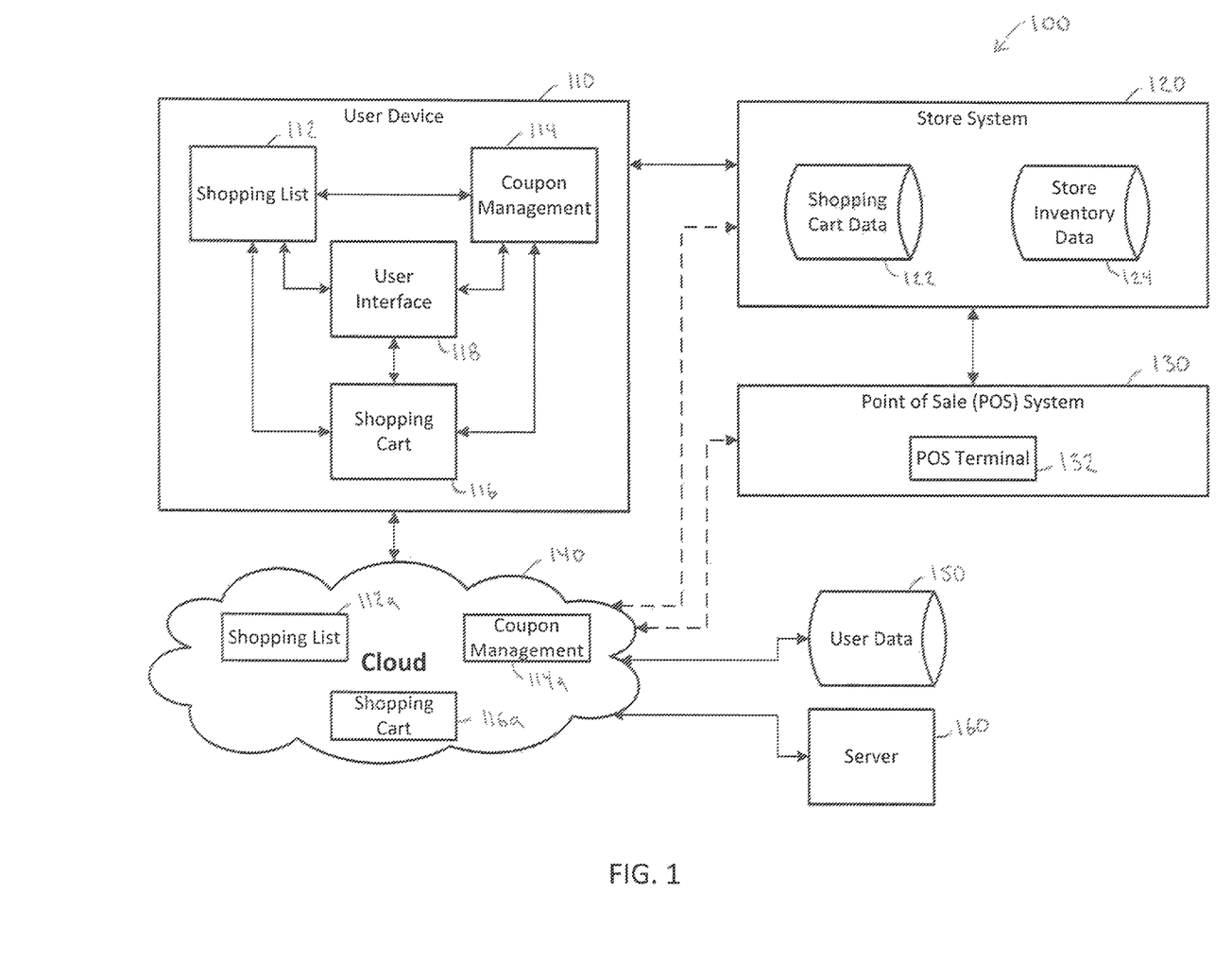
FIG. 1 is a block diagram representing an overview of one example of an environment in which one embodiment may be practiced.

As an overview, FIG. 1 is a block diagram of an environment 100 in which one or more embodiments may be practiced. The environment 100 includes one or more user devices 110, one or more store systems 120, one or more point-of-sale (POS) systems 130, a cloud computing environment 140, one or more user databases 150 and one or more servers 160. The user device 110 and the store system 120 can be wirelessly interconnected to share and exchange data through the cloud computing environment 140, which may include servers, databases, routers, switches, intranets, the Internet, and other computing and networking components and resources. Network link(s) between the user device 110, the store system 120, the POS system 130 and/or the cloud 140 may include any arrangement of interconnected networks including both wired and wireless networks. For example, a wireless communication network link over which the user device 110 communicates may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, the network links may include wireless technologies including WLAN, WiFi®, WiMAX, Wide Area Networks (WANs), and Bluetooth®. At least a portion of user data can be stored in one or more databases 150 connected to, or incorporated within, the cloud 140, such that the user data may be accessed directly or indirectly from various computing resources within the environment 100, such as the user device 110, the store system 120, the POS system 130 and/or the server 160. One or more computing devices, including the server 160, may be connected to other resources in the environment 100 via the cloud for providing cloud-based computing services including, as described below, the shopping list component 112, the coupon management component 114 and/or the shopping cart component 116.

The user device 110 may include any computing device, such as a personal computer (PC) or a mobile computing device (e.g., smart phone, tablet computer, or personal digital assistant) that is configured to connect directly or indirectly to the cloud 140, the store system 120, the POS system 130 and/or the server 160. Examples of user devices include a smartphone (e.g., the iPhone® manufactured by Apple Inc. of Cupertino, Calif., BlackBerry® manufactured by Research in Motion (RIM) of Waterloo, Ontario, any device using the Android® operating system by Google, Inc. of Mountain View, Calif., or any device using the Windows Mobile® operating system by Microsoft Corp. of Redmond, Wash.), a personal digital assistant, or other multimedia device, such as the iPad manufactured by Apple Inc. The user device 110 may connect to other components (e.g., the store system 120, the POS system 130, the cloud 140, the user database 150 and/or the server 160) over a wireless network, such as provided by any suitable cellular carrier or network service provider (e.g., Sprint PCS, T-Mobile, Verizon, AT&T, etc.), or via a WiFi® connection to a data communication network. In one embodiment, the user device 110 is a mobile computing device provided by the retail store for use while shopping, as opposed to a device owned by the customer. Such a device may be a conventional mobile device (e.g., an iPhone or iPad) or a specialized device (e.g., a handheld scanner purpose-built for interactive shopping, such as described herein).

The application(s) may include various components, such as a shopping list component 112, a coupon management component 114, and a shopping cart component 116, all or part of which may reside in the memory of the user device 110 and/or on the cloud 140, as identified in FIG. 1 at 112a, 114a and 116a, respectively. In one embodiment, the server 160 may perform some or all of the functions associated with each of the cloud-based components 112a, 114a and/or 116a, and the user device 110 may interact with the cloud-based components 112a, 114a and/or 116a via the user interface 118.

In one embodiment, the user device 110 includes memory configured to store one or more applications and/or user interfaces 118, and a processor configured to execute the application(s) and/or user interfaces 118. One example of the user device 110 is described below with respect to FIG. 5.

In one embodiment, the shopping list component 112 programmatically allows the customer to build and maintain their personalized shopping list or multiple shopping lists. The shopping list component 112 may access the cloud 140, where data representing specific item information and pricing may reside, or be accessible, so that the customer can build the shopping list based on current store inventory and prices. Store inventory and price information may be stored in a store inventory database 124 in each store system 120, or, alternatively, in the cloud 140.

In one embodiment, the coupon management component 114 programmatically allows the customer to enter, maintain and organize his or her coupons. The coupon management component 114 may be integrated with, or at least operatively connected to the shopping list component 112 via, for example, a programming interface or other tightly or loosely coupled interprocess or service interface, so as to allow the customer to add items to the shopping list by entering coupons or mark items on the shopping list where a previously entered coupon may be used. The integration may be achieved, for example, through the cloud 140 where, for example, the shopping list and coupon data is stored in the user data database 150 and accessed by both the shopping list component 112 and the coupon management component 114.

In one embodiment, the shopping cart component 116 programatically allows the customer to shop against their coupons and shopping lists by maintaining an electronic shopping cart, which is a list of items selected by the customer while shopping. As the customer selects items, he or she may scan the item's product code with the user device 110 (e.g., using a built-in scanner or camera). The shopping cart component 116 identifies the product code, and the electronic shopping cart as well as shopping list are updated with the product information. For example, each item that is scanned by the customer may be marked as selected or removed from the shopping list and placed into the electronic shopping cart. The shopping list component 112 and/or the shopping cart component 116 may provide up-to-date pricing information, including any coupons or other discounts, as well as localized taxes for providing a current total to the customer. The application may also enable a chit (not shown) to be printed (e.g., at an in-store kiosk with a printer) that may be used by the customer to assist in the checkout process. For example, the chit may be a piece of paper with a code that is readable by a POS terminal in the store for retrieving the items in the customer's electronic shopping cart during checkout. The shopping cart component 116 may further interact with a service (not shown) that provides store level directions that may assist the customer in finding the products on their list as they shop in a particular store.

In one embodiment, the user interface 118 may be provided to the user device 110 either as a downloadable software application or software as a service (i.e., software and/or data are hosted on the cloud 140). The user interface 118 may integrate user control of the functions of the shopping list component 112, the coupon management component 114 and/or the shopping cart component 116. For example, the customer may access the functionality of the shopping list, coupon management and shopping cart through the user interface 118 regardless of whether the shopping list component 112, the coupon management component 114 and/or the shopping list component 116 reside on, or are executed by, the user device 110 or the cloud 140.

In one embodiment, the POS system 130 includes at least one POS terminal 132 within the store. The POS terminal 132 may be configured to provide ways for the customer to speed up their checkout, including using the shopping cart data stored in the shopping cart database 122 and generated by the shopping cart component 116 instead of, or in addition to, conventional checkout techniques. For example, the POS system 130 may allow the customer to enter an identification number associated with his or her electronic shopping cart. The POS system 130 may then retrieve data representing the items in the customer's electronic shopping cart and any coupons held by the customer to consummate the purchase. When the transaction has been completed, the POS system 130 may close the customers shopping cart (e.g., by clearing all of the purchased items out of the cart) and mark all the used coupons as used so that the customer cannot use the same coupons again. In some embodiments, the shopping cart data is stored in a shopping cart database 122 that is resident on a computer system at the store (e.g., to reduce data access latency), although the shopping cart data may be stored at least partially in the cloud 140.

Example Use Case

The following describes one example of how a customer may use an interactive shopping system, such as described within the context of the environment 100 of FIG. 1, according to one embodiment. Using an application provided by the retailer or a third-party, a customer may log into an online account on his or her personal computer or mobile device via the user interface 118 on the user device 110. The customer may, via the user interface 118, build a shopping list by manually entering items and/or by adding items selected from an inventory listing of a local store (e.g., acquired from the store inventory database 124). The shopping list may be constructed and maintained using, for example, the shopping list component 112 or 112a, and data representing the shopping list may be stored, for example, in the user database 150 or elsewhere in the cloud 140. The customer may, using his or her mobile phone, take an image of a barcode on a coupon (e.g., coupons printed in newspapers, mailers, fliers, displays, and/or on a web site). Subsequently, the coupon is added to a list of coupons held by the customer. The coupon list may be constructed and maintained using, for example, the coupon management component 114 or 114a, and data representing the coupon list may be stored, for example, in the user database 150 or elsewhere in the cloud 140. The customer may also add an item associated with the coupon to the shopping list, if the item is not already on the shopping list, and by highlighting or visibly marking existing items on the shopping list using the user interface 118 so that the customer knows he or she has coupons for those items.

The customer may then go to his or her local store for a shopping trip and has an option to either use a personal mobile device or a mobile device that the store provides to its customers, either of which is represented by the user device 110 of FIG. 1. The user device 110 provides the customer with access to his or her shopping list and coupon list using the customer's online account. As the customer shops, he or she scans the items selected before placing them in a physical shopping cart. As the customer scans the product codes on each item, the shopping list is updated to reflect which items have been picked up and which items are remaining to be picked up. Also, an electronic shopping cart is updated to reflect the contents of the physical shopping cart. The electronic shopping cart may be constructed and maintained using, for example, the shopping cart component 116 or 116a, and data representing the contents of the electronic shopping cart may be stored in the user database 150, the shopping cart database 122 or elsewhere in the cloud 140. As the customer shops, the customer is able to view which items in the electronic shopping cart have coupons, which items do not have coupons and which additional coupons the customer holds for items that were not picked up.

Checkout Example 1

There are several ways in which the customer may checkout. In one example, the customer may use a self-checkout station in the store, which may be included in the POS terminal 132. At the self-checkout station, the customer may select an option for using a shopping list checkout. The customer may enter a personal code on a touch pad of the POS terminal 132, and in response the system displays the items that were previously scanned (i.e., items in the electronic shopping cart 122), along with the current pricing, tax and any coupon discounts. The customer completes the transaction and gives the paper coupons to a store clerk. The clerk validates the coupons and the customer pays for and leaves the store with his or her purchases.

Checkout Example 2

In another example, the customer may use an assisted checkout lane. The customer may tell the clerk that he or she is using the electronic shopping list, and enters a personal code on a key pad of the POS terminal 132. The customer gives paper coupons to the clerk and the clerk validates them. The clerk, using the POS terminal 132, tells the customer what the total amount of the purchase is and completes the transaction. The customer then leaves the store with his or her purchases.

Checkout Example 3

In yet another example, the customer may use a kiosk, which may be part of the POS system 130, to log into an online account. The customer uses the shopping list application to complete the transaction, and the system prints a bar-code enabled chit. The customer takes the chit to either a self-checkout lane or an assisted check out register. Either the customer or the clerk scans the chit, using the POS terminal 132, and then completes the transaction.

Example Process Flow

Figure 2:
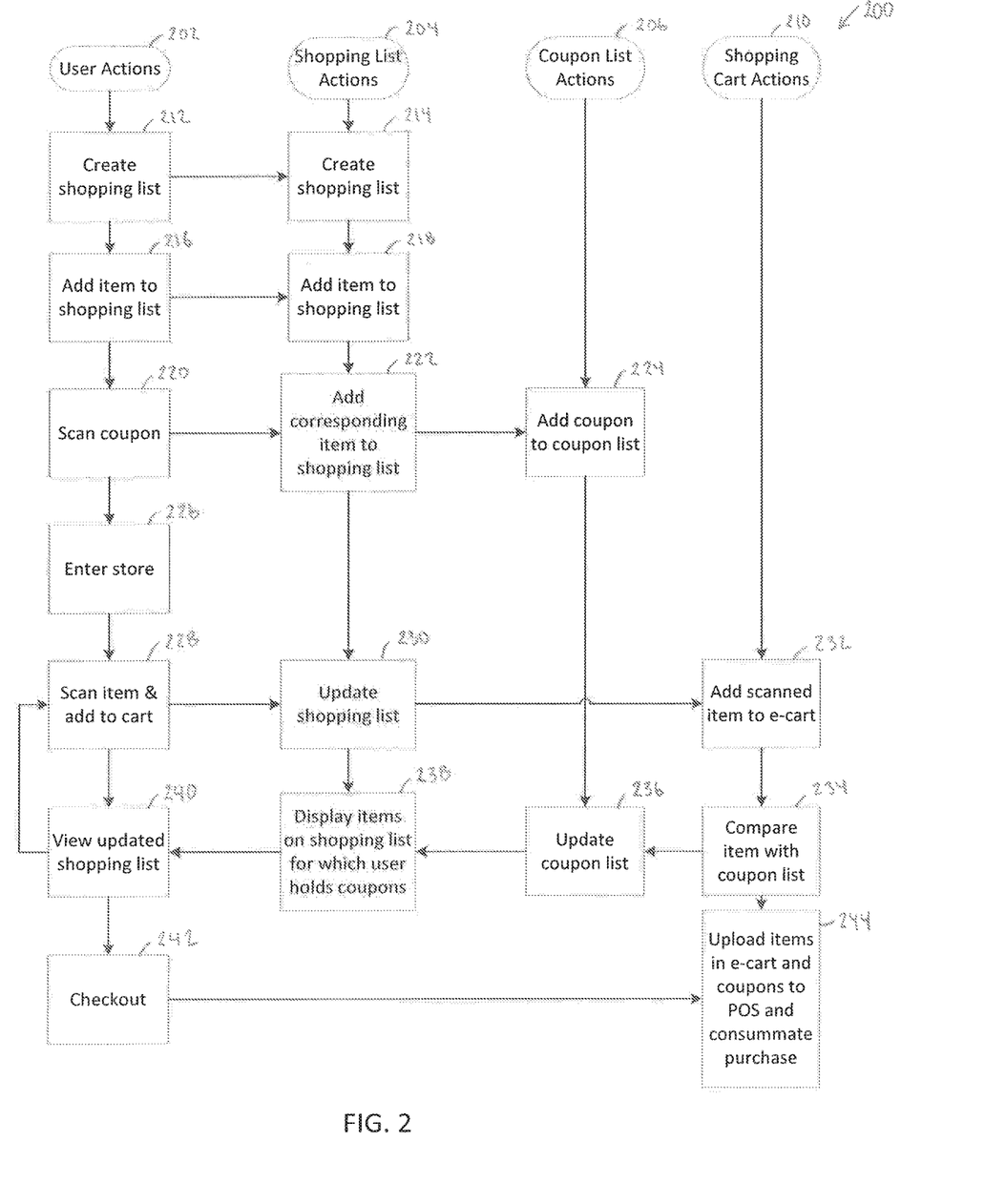
FIG. 2 is a flow diagram representing one example of a method of interactive shopping, in accordance with one embodiment.

FIG. 2 is a flow diagram of one example of a process 200 for interactive shopping, according to one embodiment. The process 200 includes several partially interdependent parallel flows: a user action flow 202, a shopping list action flow 204, a coupon list action flow 206 and a shopping cart action flow 210. The user action flow 202 represents actions that may be performed by a user, who is typically a customer of a retail store, in conjunction with an interactive shopping system, such as system 100 described above with respect to FIG. 1. The shopping list action flow 204 represents actions taken with respect to an electronic shopping list, some of which may be performed in response to certain actions occurring in the user action flow 202 and/or the coupon list action flow. The coupon list action flow 206 represents actions taken with respect to an electronic coupon list, some of which may be performed in response to certain actions occurring in the user action flow 202, the shopping list action flow 204 and/or the shopping cart action flow 210. The shopping cart action flow 210 represents actions taken with respect to an electronic shopping cart, some of which may be performed in response to certain actions occurring in the user action flow 202 and/or the shopping list action flow 204. As discussed above, in one example, the electronic shopping list is a list of items that the user wishes to purchase, the electronic coupon list is a list of coupons held by the customer for various items, and the electronic shopping cart is a list of items selected by the user while shopping in the store (i.e., the electronic shopping cart represents physical items in the user's cart).

Process 200 may begin at block 212, although it should be understood that the process 200 may begin or end at any block, depending on the nature of the user interaction with the interactive shopping system. In other words, the order of actions described herein is not necessarily a strict one, and certain actions may be performed in different sequences and, in some instances, independently of other actions. The process 200 is merely one example of how an interactive shopping process may be achieved.

At block 212, the user creates a shopping list, for example, using a user interface that is in direct or indirect communication with a server. The user interface may include, for example, a "create shopping list" button or similar input control for performing the create shopping list action 212 within the user action flow 202. In response to the create shopping list action 212, a create shopping list action occurs at block 214 in the shopping list action flows 204. The create shopping list action 214 may be performed, for example, by the server, and includes creating in memory (e.g., a database, a table or a flat file) a shopping list. The shopping list includes a data structure for storing a list of items representing various items for sale at a retail store. The user may create one or several shopping lists, for example, a grocery shopping list, a clothing shopping list, a home improvement shopping list, or any other type of list as the user desires.

For any shopping list, at block 216, the user may add an item to the shopping list. The user may add items in any number of ways, including manually selecting items from a list of items in inventory at a local store, typing in item names, importing items from a list of favorite items, etc. The user may also add items to the shopping list by scanning coupons for certain items, as described below with respect to blocks 220 and 222. Although not shown in FIG. 2, the user may also modify quantities of each item and/or delete items from the shopping list. In response to the add item to shopping list action 216, an add item to shopping list action occurs at block 218 in the shopping list action flow 204. The add item to shopping list action 216 may be performed, for example, by the server, and includes creating in memory (e.g., a database) an entry in the shopping list for the item added by the user. The user may perform the add item to shopping list action 216 any number of times as needed until the shopping list is complete.

At block 220, the user may scan a coupon to add the coupon to a list of coupons held by the user. The coupon may be printed on paper, displayed on a computer display (e.g., for an electronic coupon or eCoupon), or provided in some other human or computer-readable medium. Scanning the coupon may include, for example, using the camera of a smart phone or other similar optical device to acquire information encoded on the coupon (e.g., a barcode). The user may also enter a code associated with the coupon using a keypad or other input device rather than scanning the coupon. The scanned information may be linked in a database to other information, such as the name of the item the coupon is for, size and quantity information, discount or offer information, expiration date, and other information related to the coupon. In response to the scan coupon action 220, an add corresponding item to shopping list action may occur at block 222 in the shopping list action flow 204. The add corresponding item to shopping list action 222 may be performed, for example, by the server, and includes creating in memory (e.g., a database) an entry in the shopping list for an item associated with the scanned coupon, if the item is not already in the shopping list. In further response to the scan coupon action 220, or in response to the add corresponding item to shopping list action 222, an add coupon to coupon list action may occur at block 224. The add coupon to coupon list action 224 may be performed, for example, by the server, and includes creating in memory (e.g., a database) an entry in the coupon list for the scanned coupon. The user may perform the scan coupon action 220 any number of times as needed for each coupon the user holds.

Typically any of the actions described above in the user action flow 202 may be performed by the user prior to entering the store, such as at home or work before going on a shopping trip. However, the process 200 does not preclude performing any of those actions after the user enters the store, as shown at block 226. The following user actions in the user action flow 202 may be performed after the user enters the store and before the user leaves the store with his or her purchases.

After the user enters the store 226, the user begins to select items for purchase. At block 228, as each item is selected, the user may scan the Universal Product Code (UPC), produce code, or other identifying code for the item and place the item in a physical shopping cart. The user may scan the item with, for example, a camera integrated into a smart phone, a hand-held scanner provided by the store, or other device configured to read or receive item codes. The scan item action 228 may be performed any number of times as the user picks up items in the store.

In response to the scan item action 228, an update shopping list action may occur at block 230 in the shopping list action flow 204. The update shopping list action 230 may be performed, for example, by the server, and includes updating the shopping list to show that the item has been selected for purchase (e.g., the item is removed from the shopping list or marked as selected). In further response to the scanning the item action 228, an add scanned item to electronic shopping cart (e-cart) action may occur at block 232 in the shopping cart action flow 210. The add scanned item to e-cart action 232 may be performed, for example, by the server or by another computer system that is locally situated at or near the store (e.g., to reduce communication latency delays or to make the shopping cart data more easily accessible to in-store POS system), and includes updating the e-cart to include the scanned item.

In response to the add scanned item to the e-cart action 232, a compare item with coupon list action may occur at block 234 in the shopping cart action flow 210. The compare item action 234 may be performed, for example, by the server or the local store system, and includes comparing the item added to the e-cart with any coupons held by the user (i.e., coupons in the coupon list). If the item in the e-cart matches one or more of the coupons in the e-cart, an update coupon list action may be performed at block 236 in the coupon list action flow 206. The update coupon list action 236 may be performed, for example, by the server, and includes removing the coupon(s) matched to the item in the e-cart from the coupon list subsequent to adding the respective item to the e-cart, since the coupons are now considered "used" and may not be used again for other items (assuming the coupons are for single use only). At checkout, the purchase total may be adjusted to reflect any discounts associated with the used coupons.

In further response to the add scanned item to the e-cart action 232, a display items on shopping list for which user holds coupons action may occur at block 238. The display items action 238 may be performed, for example, by a user interface on the user device (e.g., smart phone, PDA, or store-provided device) using data provided by the server or the local store system, and includes identifying which items on the shopping list (i.e., items not yet picked up) the user holds coupons for. The user, at block 240, may view the updated shopping list on the user device.

After the user has completed shopping, the user may proceed to checkout at block 242. As described in the examples above, there are various ways for the user to consummate their purchases. For example, in response to the checkout action 242, all of the items in the e-cart, as well as any information regarding coupons, may be uploaded to a POS system in the store (e.g., at block 244 in the shopping cart action flow 210), which processes the user's purchases before the user leaves the store.

Example User Interface

Figure 3:
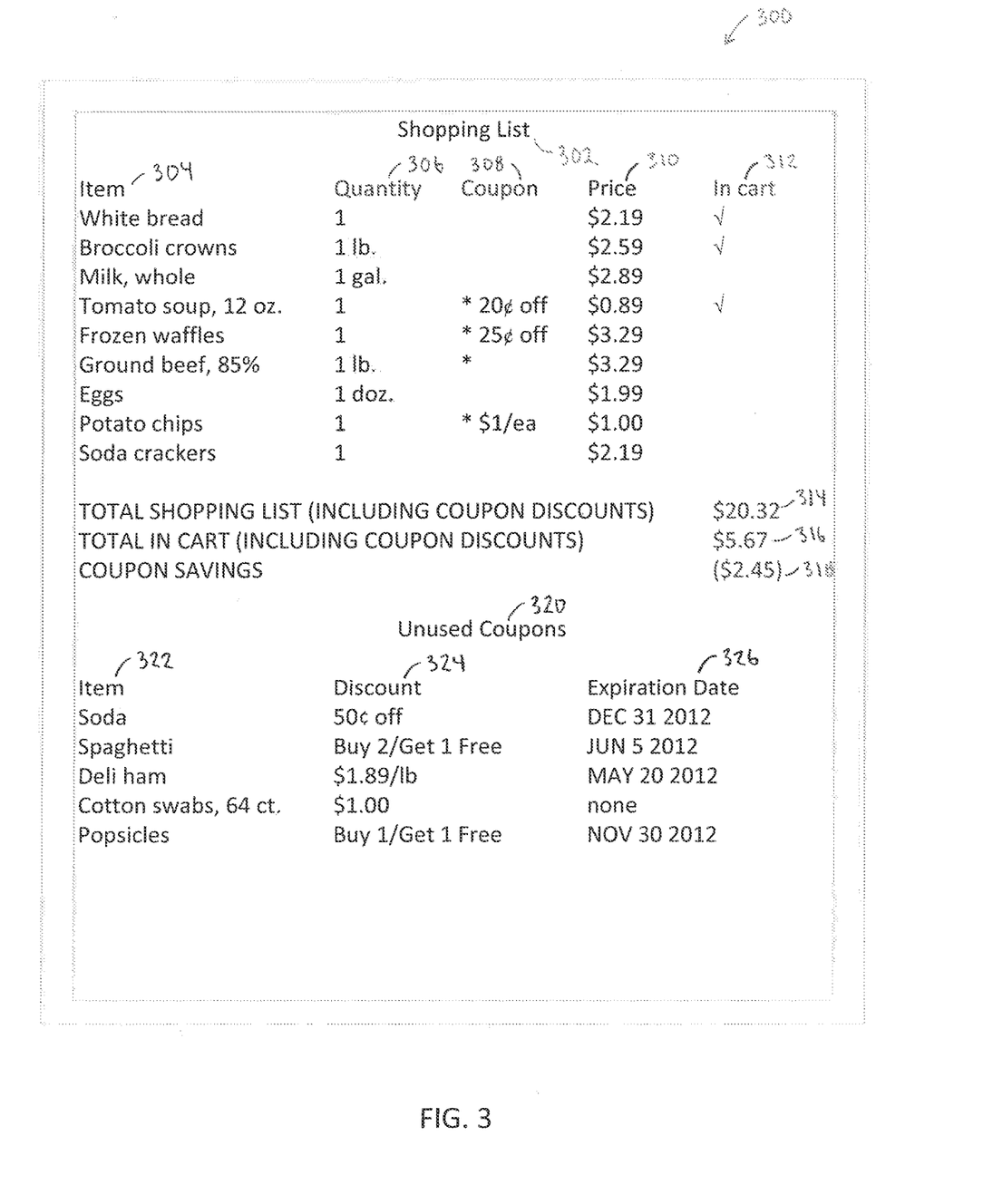
FIG. 3 is one example of a user interface for use in the environment and/or method of FIGS. 1 and 2, in accordance with one embodiment.

FIG. 3 is one example of a user interface 300 for interactive shopping, in accordance with an embodiment. The user interface 300 may include one or more of the following: a list of items representing items on a shopping list of a user, a list of coupons held by the user, and/or price, discount and quantity information. The user interface 300 may be configured to be displayed on any computing device, including mobile devices such as smart phones, PDAs, handheld scanners, or other similar devices.

One portion of the user interface 300 may include a shopping list 302. The shopping list 302 may include item descriptions 304, a quantity of each item 306, coupon information for each item 308, item price 310 (with and/or without coupon discounts applied), and an "in cart" column 312 that indicates which items on the shopping list have already been placed in the user's shopping cart.

In one example, as the user adds items to the shopping list, the current price (e.g., retrieved from the user's local store) is displayed along with any coupons already held by the user for the respective item. Later, as the user shops in the store and scans items that are picked up, the corresponding items on the shopping list are either marked as "in cart" or are deleted from the shopping list. The user interface 300 may further display a total for all of the items in the shopping list 314, a total for all items in the cart 316, and/or a total of all coupon savings 318 (e.g., coupon savings for all items in the shopping list and/or all items in the shopping cart). Any of the above-described elements of the user interface 300 may be updated to reflect any changes to the respective elements.

Another portion of the user interface 300 may include a coupon list 320. The coupon list 320 may include item descriptions 322 for each item associated with a coupon, coupon discounts 324, and/or expiration dates 326 (if any) associated with each coupon. The coupon list may include coupons held by the user for items not in the shopping list so as to remind the user which coupons he or she holds. As described above, coupons may be added to the coupon list by scanning them. In one example, as coupons are scanned, the associated item is automatically added to the shopping list; however, this feature may be optional and/or the user may manually remove items from the shopping list after the items are automatically added. Thus it is possible that the user may hold coupons for some items not included in the shopping list.

It should be understood that the user interface 300 as shown in FIG. 3 is merely one example of an arrangement of information that may be presented to the user, and that the user interface 300 is intended to be flexible in that the information, or other information, may be presented within the user interface 300 in various different forms and arrangements. For example, separate lists may be presented to show the items in the shopping list and the items in the shopping cart, or the lists may be merged together as shown in the example of FIG. 3. In another example, different screens may be used to display the different portions of the user interface 300, such as placing the shopping list on one screen, the shopping cart on another screen, and the coupon list on yet another screen.

Exemplary Computing Devices

Figure 4:
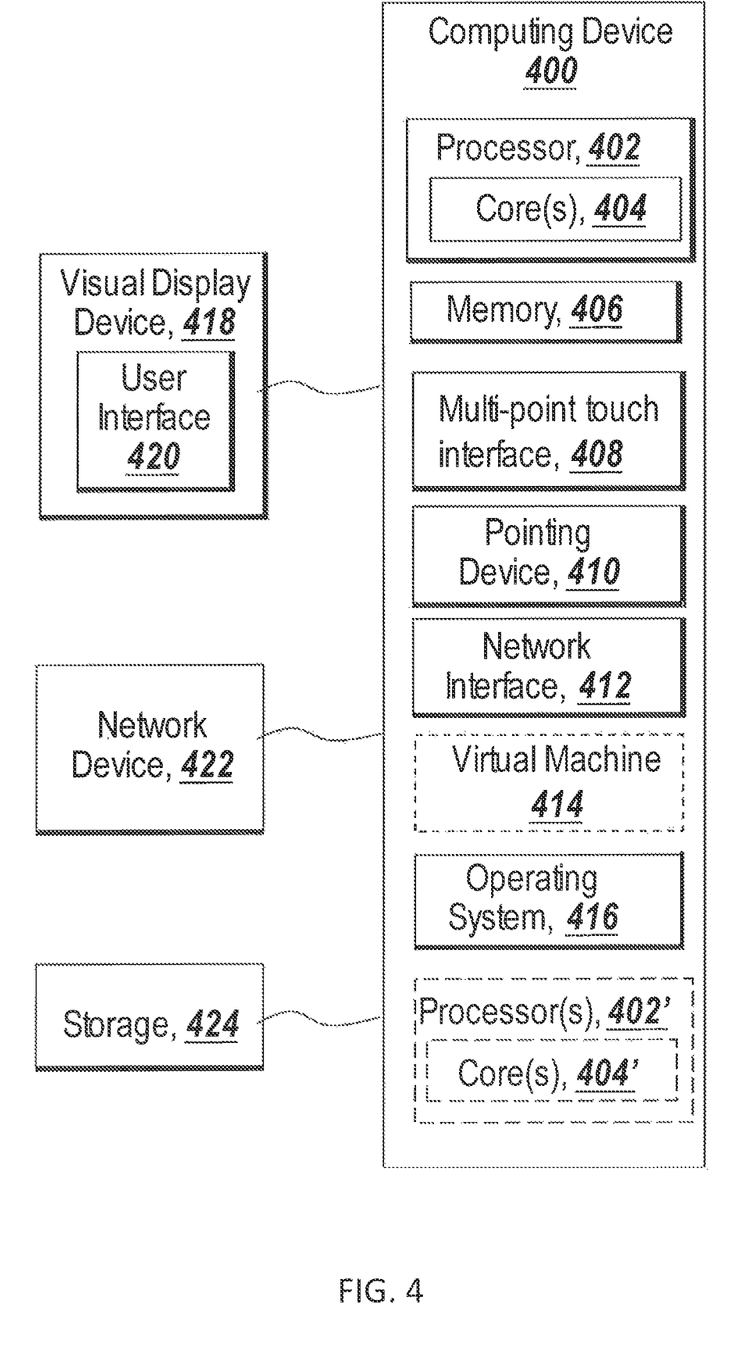
FIG. 4 is a block diagram showing one example of a computing device that may be used to perform any of the methods provided by various embodiments.

FIG. 4 is a block diagram of an exemplary computing device 400 that may be used to perform any of the methods provided by exemplary embodiments. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. For example, memory 406 included in the computing device 400 may store computer-executable instructions or software for implementing exemplary embodiments. The computing device 400 also includes processor 402 and, optionally, one or more additional processor(s) 402' for executing computer-executable instructions or software stored in the memory 406, and other programs for controlling system hardware. Processor 402 and optional processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more user interfaces 420 or any other interface. The computing device 400 may include other I/O devices such a keyboard or a multi-point touch interface 408 and a pointing device 410, for example a mouse, for receiving input from a user. The keyboard 408 and the pointing device 410 may be connected to the visual display device 418. The computing device 400 may include other suitable conventional I/O peripherals. The computing device 400 may also include a storage device 424, such as a hard-drive, CD-ROM, or other computer readable media, for storing data and computer-readable instructions or software that implement exemplary embodiments.

The computing device 400 may include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless or cellular connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system 416 may be run in native mode or emulated mode. In an exemplary embodiment, the operating system 416 may be run on one or more cloud machine instances.

Figure 5:
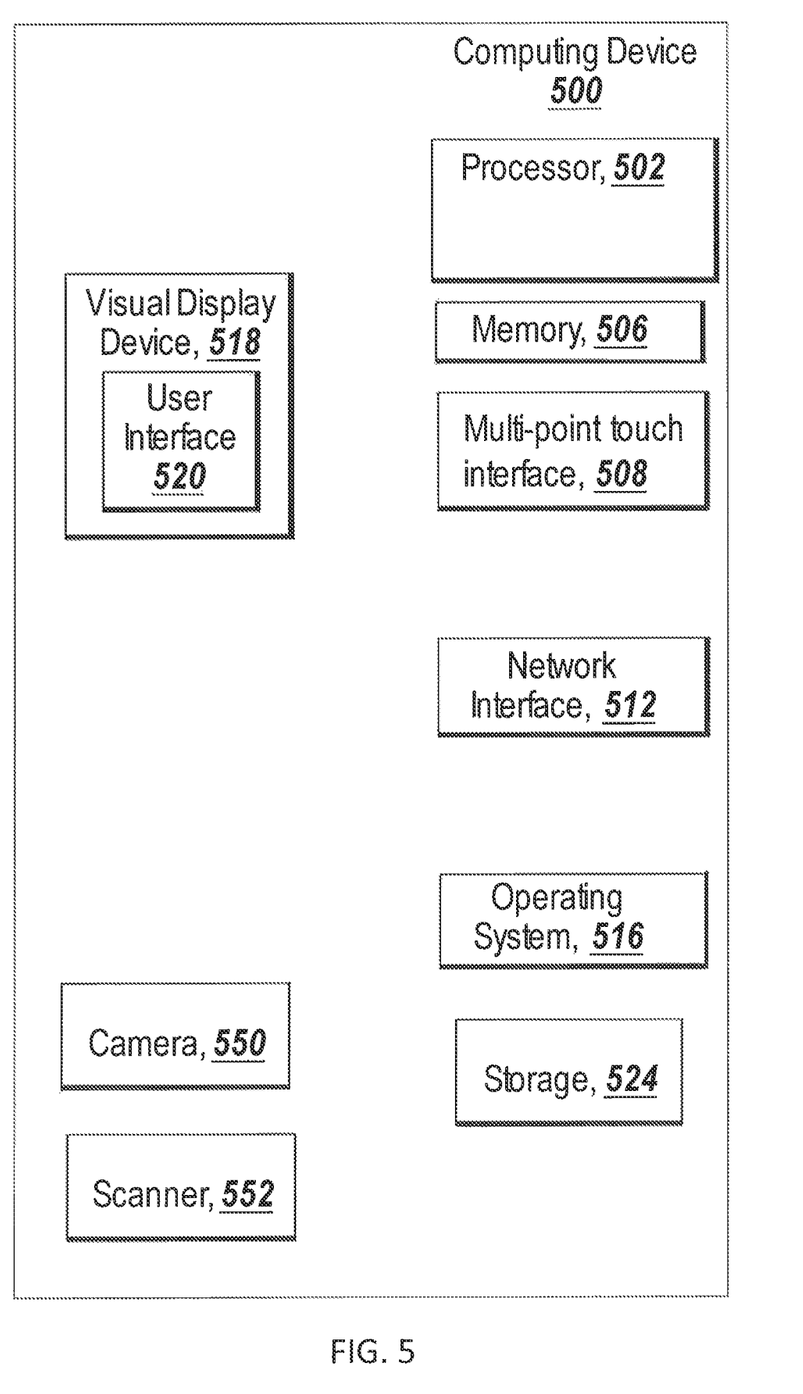
FIG. 5 is a block diagram showing one example of a mobile computing device that may be used to perform any of the methods provided by various embodiments.

FIG. 5 is a block diagram of an exemplary mobile user computing device 500, such as the user computing device 110 of FIG. 1, that may be used to perform any of the methods provided by exemplary embodiments. The computing device 500 may, for example, be substantially similar to the computing device 400 of FIG. 4, except that the mobile device 500 also includes a camera 550 and/or a scanner 552 for capturing images of bar codes, etc. for the purposes described herein. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. For example, memory 506 included in the computing device 500 may store computer-executable instructions or software for implementing exemplary embodiments, including the shopping list component 112, the coupon management component 114, the shopping cart component 116 and/or the user interface 118 of FIG. 1. The computing device 500 also includes processor 502 for executing computer-executable instructions or software stored in the memory 506, and other programs for controlling system hardware.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518 for displaying a user interface 520, such as a LCD or TFT display, which may display one or more user interfaces 520 (such as the user interface 118 of FIG. 1) or any other interface. The computing device 500 may include other I/O devices such a keyboard or a multi-point touch interface 508, for example a touch screen, touch pad or keypad, for receiving input from a user. The computing device 500 may also include a storage device 524, such as a hard-drive, CD-ROM, or other computer readable media, for storing data and computer-readable instructions or software that implement exemplary embodiments.

The computing device 500 may include a network interface 512 configured to interface with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 516, such as any of the versions of the Microsoft® Windows® Mobile or Apple iOS operating systems, the different releases of the Unix and Linux operating systems, any embedded operating system, any real-time operating system, any open source operating system, any proprietary operating system, any operating systems for mobile computing devices, or any other operating system capable of running on the computing device and performing the operations described herein.

Having thus described several exemplary embodiments of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method for building an electronic shopping cart in response to images captured by a mobile electronic device and controlling a use of electronic coupons, the method comprising:
providing a downloadable user interface readable on a mobile electronic device wherein execution of the downloadable user interface by the mobile electronic device allows the mobile electronic device to:
display shopping list data representing items in an electronic shopping list associated with the customer via the downloadable user interface, the shopping list including items from an inventory database associated with a retail store in response to selection of the items by the customer via the downloadable user interface prior to entering a retail store;
generate, via the downloadable user interface:
a listing of the items in the electronic shopping list with indications of the items in the electronic shopping list for which the customer holds coupons and indications of the items in the electronic shopping list for which the customer does not hold coupons; and
a listing of:
unused coupons held by the customer that are associated with additional items that are not in the electronic shopping list of the customer; and
the additional items that are not in the electronic shopping list of the customer for which the customer holds the unused coupons;
the customer being permitted to add, to the electronic shopping list of the customer, at least one of the additional items that are associated with the unused coupons and that are not in the electronic shopping list of the customer;
an association between stored coupon data representing the coupons held by the customer and one or more of the items in the electronic shopping list and the additional items that are not in the electronic shopping list of the customer;
receive, through the user interface, new coupon data representing a new coupon held by the customer for an item;
update the coupon data to add the new coupon to the coupons held by the customer in response to receiving the new coupon data;
automatically update the shopping list data to add the item associated with the new coupon to the shopping list in response to receiving the new coupon data;
capture images of product codes for items within a retail store via a camera of the mobile electronic device;
automatically add the items to an electronic shopping cart in response to capturing the image of the product codes within the retail store by the camera of the mobile electronic device;
automatically delete items from the electronic shopping list in response to capturing the image of the product codes within the retail store by the camera of the mobile electronic device;
update the downloadable user interface to display a graphical indication of an association between stored coupon data and one or more of the items in the electronic shopping list or the electronic shopping cart;
store, at a database remote to the mobile electronic device, data representative of the items in the electronic shopping cart and a first subset of the stored coupon data associated with the items in the electronic shopping cart;
receiving, by a point of sale terminal, an identification code associated with the electronic shopping cart from the mobile electronic device;
retrieving from the database, by the point of sale terminal using the identification code, the data representative of the items in the electronic shopping cart and the first subset of the stored coupon data associated with the items in the electronic shopping cart, wherein the point of sale terminal displays the items in the electronic shopping cart, the current pricing, tax, and coupon discounts; and
completing a transaction at the point of sale terminal involving the one or more items in the electronic shopping cart identified using the identification code, wherein in response to completing the transaction involving the one or more items in the electronic shopping cart, clearing the electronic shopping and modifying the first subset of stored coupon data to add a marker that prevents subsequent use of the first subset of stored coupon data.

2. The computer-implemented method of claim 1, further comprising storing, in one or more computer-readable storage media, a shopping list data structure for storing the shopping list data.

3. The computer-implemented method of claim 2, further comprising storing, in the one or more computer-readable storage media, a coupon data structure for storing the stored coupon data.

4. The computer-implemented method of claim 1, wherein the new coupon data is provided by the customer as a result of scanning a barcode on the new coupon and/or entering a code associated with the new coupon.

5. The computer-implemented method of claim 1, further comprising displaying, through the user interface, a list of the items in the electronic shopping list with indications of items for which the customer holds coupons and/or indications of items for which the customer does not hold coupons.

6. The computer-implemented method of claim 1, further comprising receiving, through the user interface, new selected item data representing a new item selected by the customer for inclusion in an electronic shopping cart, the new selected item data being provided by the customer as a result of scanning a barcode associated with the new item and/or entering a code associated with the new item while shopping in the retail store.

7. The computer-implemented method of claim 6, further comprising, in response to receiving the new selected item data, updating the selected items data to add the new item to the electronic shopping cart.

8. The computer-implemented method of claim 7, further comprising displaying to the customer, using the user interface and based upon the updated selected item data and the updated coupon data, the items in the electronic shopping cart indicating items for which the customer holds coupons and/or indicating items for which the customer does not hold coupons.

9. The computer-implemented method of claim 7, further comprising receiving, through one of the user interface and a self-checkout terminal, a request to checkout from the customer and, in response thereto, consummating a sale of the items in the electronic shopping cart by discounting a price of each item in the electronic shopping cart for which the customer holds coupons by an amount corresponding to the respective coupons.

10. The computer-implemented method of claim 9, further comprising printing, using a printer coupled to one of the user interface and the self-checkout terminal, a chit having a machine-readable code printed thereon, the machine-readable code representing an order associated with the sale of the items in the electronic shopping cart that, when recalled by a point-of-sale terminal configured to read the machine-readable code, enables the sale to be consummated.

11. The computer-implemented method of claim 9, further comprising updating, subsequent to consummating the sale of the items in the electronic shopping cart, the stored coupon data to remove each of the coupons used to consummate the sale of the items in the electronic shopping cart from the coupons held by the customer.

12. The computer-implemented method of claim 1, wherein execution of the downloadable user interface by the mobile electronic device allows the mobile electronic device to:
manage an electronic shopping cart via the downloadable user interface, the electronic shopping cart including the items from the electronic shopping list that have been obtained by the customer at the retail store; and
programmatically remove the items from the electronic shopping list that have been obtained by the customer from the electronic shopping list.

13. The computer-implemented method of claim 1, wherein the shopping list data is managed by a shopping list component via the downloadable user interface and the stored coupon data is managed by a coupon management component via the downloadable user interface.

14. The computer-implemented method of claim 13, wherein installation of the shopping list component and the coupon management component on the mobile electronic device programs the mobile electronic device to support interactive shopping.

15. The computer-implemented method of claim 14, further comprising:

provide a shopping cart component that programs the mobile electronic device to be used by a user to shop against the stored coupon data and the electronic shopping list by maintaining an electronic shopping cart that includes scanned item product codes.

16. The computer-implemented method of claim 1, wherein a listing of coupons held by the customer that are associated with the additional items that are not in the electronic shopping list of the customer includes an indication of the discount provided by the coupons held by the customer that are associated with the additional items that are not in the electronic shopping list of the customer, and an expiration date of each of the coupons held by the customer that are associated with the additional items that are not in the electronic shopping list of the customer.

\* \* \* \* \*